United States Patent
Yoshida et al.

(10) Patent No.: US 7,310,972 B2
(45) Date of Patent: Dec. 25, 2007

(54) PROCESS AND APPARATUS FOR SEPARATION OF HYDROCARBONS FROM LIQUEFIED NATURAL GAS

(75) Inventors: Nobuhiro Yoshida, Chiba (JP); Shoichi Yamaguchi, Chiba (JP); Susumu Ohara, Chiba (JP); Akhilesh Kumar, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 540 days.

(21) Appl. No.: 10/942,842

(22) Filed: Sep. 17, 2004

(65) Prior Publication Data

US 2005/0218041 A1  Oct. 6, 2005

(30) Foreign Application Priority Data

Apr. 5, 2004 (JP) .............................. 2004-111236
Jun. 4, 2004 (JP) .............................. 2004-167236

(51) Int. Cl.
*F25J 3/02* (2006.01)
*F25J 3/00* (2006.01)

(52) U.S. Cl. ............................ 62/620; 62/618; 62/621; 62/622

(58) Field of Classification Search ................. 62/620, 62/621, 622, 623; 585/800
See application file for complete search history.

(56) References Cited

U.S. PATENT DOCUMENTS

| | | | |
|---|---|---|---|
| 2,952,984 A | 9/1960 | Marshall | |
| 3,837,172 A | 9/1974 | Markbreiter et al. | |
| 5,114,451 A | 5/1992 | Rambo et al. | |
| 6,510,706 B2 | 1/2003 | Stone et al. | |
| 6,564,579 B1 | 5/2003 | McCartney | |
| 6,564,580 B2 | 5/2003 | Bowen et al. | |
| 6,604,380 B1 | 8/2003 | Reddick et al. | |
| 6,907,752 B2* | 6/2005 | Schroeder et al. | ............ 62/620 |
| 2003/0158458 A1 | 8/2003 | Prim | |

OTHER PUBLICATIONS

Dan McCartney, "Gas Conditioning for Imported LNG", 82nd Annual Convention Gas Processors Association, Mar. 11, 2002, 11 pages.
C.C. Yang, et al., "Cost-Effective Design Reduces $C_2$ and $C_3$ at LNG Receiving Terminals", Oil & Gas Journal, May 26, 2003, pp. 50-53.
J. Mak, et al., "LNG Flexibility", Hydrocarbon Engineering, Oct. 2003, pp. 26, 28, 30 and 32.

* cited by examiner

*Primary Examiner*—Glenn Caldarola
*Assistant Examiner*—Randy Boyer
(74) *Attorney, Agent, or Firm*—Oblon, Spivak, McClelland, Maier & Neustadt, P.C.

(57) ABSTRACT

An apparatus and process for separating a feed liquefied natural gas containing at least methane and a hydrocarbon less volatile the methane, into a product natural gas enriched with methane and lean in hydrocarbon less volatile than methane and a heavier fraction lean in methane and enriched with hydrocarbon less volatile than methane. The process includes heating the feed liquefied natural gas in a heat exchanger, passing the heated fluid into a distillation column, withdrawing the heavier fraction from a bottom of the column, and withdrawing a residue gas from a top of the column. The process also includes liquefying at least part of the residue gas in the heat exchanger, refluxing a part of the liquid portion of the fluid obtained in the liquefying step into the column, and withdrawing, as the product narutal gas, the remainder of the liquid portion.

4 Claims, 3 Drawing Sheets

PROCESS AND APPARATUS FOR SEPARATION OF HYDROCARBONS FROM LIQUEFIED NATURAL GAS

BACKGROUND

1. Field of the Invention

The present invention relates to a process and apparatus for separation of hydrocarbons, used for separating and recovering hydrocarbons such as ethane, propane and the like from a liquefied natural gas.

2. Background of the Invention

It is being conducted generally to liquefy a natural gas at about −162° C. at around atmospheric pressure, send the liquefied natural gas to a marketplace by marine transportation, vaporize the liquefied natural gas, then feed it into a natural gas pipeline as a town gas or as a fuel for thermal power generation. Incidentally, a natural gas liquefied at around atmospheric pressure is called liquefied natural gas (LNG). The liquefied natural gas received at the marketplace contains, in some cases, a large amount of hydrocarbons of 2 to 5 carbon atoms. Such a liquefied natural gas has a high calorific value and therefore may not meet the natural gas specification required by the marketplace. Or, the hydrocarbons of 2 to 5 carbon atoms (e.g. ethane and propane) contained in liquefied natural gas can be used as a raw material for petrochemical plants and therefore have, in some cases, a higher commercial value than when used as a town gas or as a fuel for thermal power generation. Hence, it has been desired to separate and recover hydrocarbons of 2 or more carbon atoms from a liquefied natural gas received by the marketplace before the natural gas is fed into a natural gas pipeline.

For separation and recovery of hydrocarbons such as ethane, propane and the like from a liquefied natural gas, it is possible to apply a process described in U.S. Pat. No. 6,510,706 (Patent Literature 1). This process is concerned with a technique of liquefying, for liquid transportation, a natural gas at a temperature exceeding −112° C. (−170° F.) and sufficient for the liquefied natural gas at or below its bubble point. Incidentally, a natural gas liquefied in a pressurized state is called pressurized liquid natural gas (PLNG) and is distinguished from the above-mentioned liquefied natural gas (LNG). According to the technique, hydrocarbons less volatile than methane can be removed from a pressurized liquid natural gas (PLNG). This technique may be applied to a process for separating and recovering hydrocarbons such as ethane, propane and the like from a liquefied natural gas (LNG) transported at around atmospheric pressure at about −162° C. In the literature, a process is described including heating feed PLNG in a heat exchanger, thereby vaporizing at least a portion of the PLNG; passing the partially vaporized PLNG to a fractionation column; withdrawing a liquid stream enriched with hydrocarbons less volatile than methane from a lower portion of the fractionation column; withdrawing a vapor stream from an upper portion of the fractionation column; and passing the vapor stream to the heat exchanger to condense the vapor to produce PLNG lean in hydrocarbons less volatile than methane. In the literature, it is also described that when higher recovery rate of ethane and propane is desired, a reflux effect is obtained by withdrawing part of the feed PLNG and feeding it into the top of the distillation column in a liquid state without the vaporization by the heat exchanger, whereby ethane and propane can be obtained at a higher recovery rate.

For separation and recovery of hydrocarbons such as ethane, propane and the like from a liquefied natural gas, there can also be used a process disclosed in U.S. Pat. No. 2,952,984 (Patent Literature 2). In the literature, there is described a process including feeding a liquefied natural gas into the middle portion of a fractionation column; heating the contents of the lower portion of the fractionation column to produce methane-enriched vapors in the upper portion of the fractionation column; withdrawing vapors from the upper portion of the fractionation column and directly passing the vapors in heat exchange relation with the liquefied natural gas being fed to the fractionation column, to heat the feed and cool the vapors; separating condensed liquid from the vapors; refluxing the condensed liquid to the upper portion of the fractionation column; and withdrawing a heavier hydrocarbon from the lower portion of the fractionation column.

When the process described in the Patent Literature 1 is applied for separation and recovery of hydrocarbons such as ethane and the like from a liquefied natural gas, no high reflux effect is obtained because a feed liquefied natural gas which is low in methane concentration is used as a reflux for distillation column, and the recovery rate of ethane is considered to remain at about 92%. Here, the ethane recovery rate means a proportion at which the ethane contained in feed liquefied natural gas is separated from a product liquefied natural gas and recovered as a component of NGL(natural gas liquid); that is, the ethane recovery rate is a value obtained by dividing the ethane amount in NGL by the ethane amount in feed liquefied natural gas. Such an ethane recovery rate, i.e., at most about 92%, may be sufficient in order to adapt the product LNG to the natural gas specification of the marketplace; however, in order to obtain hydrocarbons of 2 to 5 carbon atoms as a raw material gas for a petrochemical plant, recovery of a higher amount of ethane for effective ethane utilization is desired from an economical standpoint. Thus, further improvement in ethane or propane recovery rates has been desired.

In the process described in the Patent Literature 2, the condensed liquid of an overhead gas of distillation column in which methane is concentrated, is fed as a reflux for the distillation column; therefore, there is an advantage of high refluxing effect. In this process, the gas from the upper portion of the distillation column is cooled, the resulting condensed liquid is separated, a residue natural gas is withdrawn in a gaseous state and then compressed by a compressor to a pressure required for pipeline transportation. Therefore, there has been a problem in that a large energy is required for the gas compression.

SUMMARY OF THE INVENTION

An object of the present invention is to provide a process and apparatus that can conduct separation of hydrocarbons from a liquefied natural gas more effectively. Particularly, an object of the present invention is to provide a process and apparatus for separation of hydrocarbons using a distillation column, wherein an improved separation efficiency is obtained and thereby a high ethane or propane recovery rate is attainable. Another object of the present invention is to provide a process and apparatus for separation of hydrocarbons, wherein the required energy can be made relatively small.

The present invention provides a process for separating a feed liquefied natural gas containing at least methane and a hydrocarbon less volatile than methane, into a product natural gas enriched with methane and lean in the hydrocarbon less volatile than methane and a heavier fraction lean in methane and enriched with the hydrocarbon less volatile than methane, using a distillation column. The process includes the steps of:
(a) heating the feed liquefied natural gas in a heat exchanger;
(b) passing the fluid heated in step (a) into a distillation column;
(c) withdrawing the heavier fraction from the bottom part of the distillation column;
(d) withdrawing a residue gas from the top part of the distillation column;
(e) liquefying at least a part of the residue gas in the heat exchanger;
(f) refluxing a part of the liquid portion of the fluid obtained in step (e) into the distillation column; and
(g) withdrawing, as the product natural gas, the remainder of the liquid portion of the fluid obtained in step (e), which has not been fed into the distillation column in step (f).

The present invention also provides a process for separating a feed liquefied natural gas containing at least methane, ethane and a hydrocarbon less volatile than ethane, into a product natural gas enriched with methane and ethane and lean in the hydrocarbon less volatile than ethane and a heavier fraction lean in methane and ethane and enriched with the hydrocarbon less volatile than ethane, using a distillation column. The process includes the steps of:
(a) heating the feed liquefied natural gas in a heat exchanger;
(b) passing the fluid heated in step (a) into a distillation column;
(c) withdrawing the heavier fraction from the bottom part of the distillation column;
(d) withdrawing a residue gas from the top part of the distillation column;
(e) liquefying at least a part of the residue gas in the heat exchanger;
(f) refluxing a part of the liquid portion of the fluid obtained in step (e) into the distillation column; and
(g) withdrawing, as the product natural gas, the remainder of the liquid portion of the fluid obtained in step (e), which has not been fed into the distillation column in step (f).

The above processes may further include the step of (h) heating the fluid heated in step (a), in a heat exchanger different from the heat exchanger used in step (a), prior to step (b).

In this process, a part of the residue gas may be liquefied in step (e), and the process may further include the steps of:
(i) separating a gas portion from the fluid obtained in step (e) and then pressuring the gas portion;
(j) liquefying the whole portion of the fluid obtained in step (i), in the heat exchanger used in step (h); and
(k) withdrawing the fluid obtained in step (j) as a product natural gas.

The present invention also provides an apparatus for separating a feed liquefied natural gas containing at least methane and a hydrocarbon less volatile than methane, into a product natural gas enriched with methane and lean in the hydrocarbon less volatile than methane and a heavier fraction lean in methane and enriched with the hydrocarbon less volatile than methane, using a distillation column. The apparatus includes:
a distillation column to which a heated feed liquefied natural gas is fed, from the bottom part of which the heavier fraction is withdrawn, and from the top part of which a residue gas is withdrawn;
a heat exchanger in which the feed liquefied natural gas and the residue gas are heat exchanged to heat the feed liquefied natural gas and to cool the residue gas and liquefy at least a part of the residue gas;
a refluxing means for refluxing a part of the liquid portion of the residue gas which has been liquefied at least partially in the heat exchanger, into the distillation column; and
a line for withdrawing the remainder of the liquid portion of the residue gas which has been liquefied at least partially in the heat exchanger, as a product natural gas.

The present invention also provides an apparatus for separating a feed liquefied natural gas containing at least methane, ethane and a hydrocarbon less volatile than ethane, into a product natural gas enriched with methane and ethane and lean in the hydrocarbon less volatile than ethane and a heavier fraction lean in methane and ethane and enriched with the hydrocarbon less volatile than ethane, using a distillation column. The apparatus includes:
a distillation column to which a heated feed liquefied natural gas is fed, from the bottom part of which the heavier fraction is withdrawn, and from the top part of which a residue gas is withdrawn;
a heat exchanger in which the feed liquefied natural gas and the residue gas are heat exchanged to heat the feed liquefied natural gas and to cool the residue gas and liquefy at least a part of the residue gas,
a refluxing means for refluxing a part of the liquid portion of the residue gas which has been liquefied at least partially in the heat exchanger, into the distillation column; and
a line for withdrawing the remainder of the liquid portion of the residue gas which has been liquefied at least partially in the heat exchanger, as a product natural gas.

These apparatuses may further include between the heat exchanger and the distillation column, at least one second heat exchanger for further heating the liquefied natural gas.

In this apparatus, the heat exchanger for cooling the residue gas may liquefy a part of the residue gas, and the apparatus may further include a gas-liquid separation means for separating the partially liquefied fluid obtained in the heat exchanger for cooling the residue gas, into a liquid portion and a gas portion; and a pressurization means for pressurizing the gas portion, said second heat exchanger liquefying the whole portion of the pressurized gas portion. And the apparatus may still further include a line for withdrawing the fluid liquefied in the second heat exchanger, as a product natural gas.

In the present invention, the overhead gas of a distillation column (a demethanizer in the case of ethane recovery and a deethanizer in the case of propane recovery) is cooled and condensed and the resulting liquefied natural gas high in methane or ethane concentration is used as a reflux. Thereby, the methane or ethane concentration in the overhead gas of distillation column is increased; there is obtained a higher separation efficiency; and a higher ethane or propane recovery rate is obtained. Further in the present invention, at least a part or the whole of the residue natural gas withdrawn as a product can be in a liquid state. Thereby, when the product natural gas is fed into, for example, a pipeline, the power required for pressurization of the natural gas can be relatively small.

The numerals used in these Figures indicate the following:

1: Feed liquefied natural gas;
2: Pump for feed liquefied natural gas;
3: Feed liquefied natural gas reflux;
4: Reflux condenser;
5: Demethanizer feed (deethanizer feed in the case of propane; recovery plant);
6: Demethanizer (deethanizer in the case of propane recovery plant);
7: Residue gas;
8: NGL (natural gas liquid);
9: Reflux drum;
10: Reflux pump;
11: Liquefied residue gas reflux;
12: Product liquefied natural gas;
13: Reboiler;
14: Demethanizer feed preheater;
15: Second residue gas;
16: Residue gas compressor;
17: Pressurized residue gas;
18: Pressurized residue gas condenser;
19: Liquefied pressurized residue gas;
21: Fluid obtained by cooling of residue gas by reflux condenser;
22: Fluid obtained by heating of feed liquefied natural gas by reflux condenser;
23: Fluid obtained by heating of fluid 22 by pressurized residue gas condenser; and
24: Liquefied residue gas withdrawn as a product

DETAILED DESCRIPTION OF THE INVENTION

Figure 1:
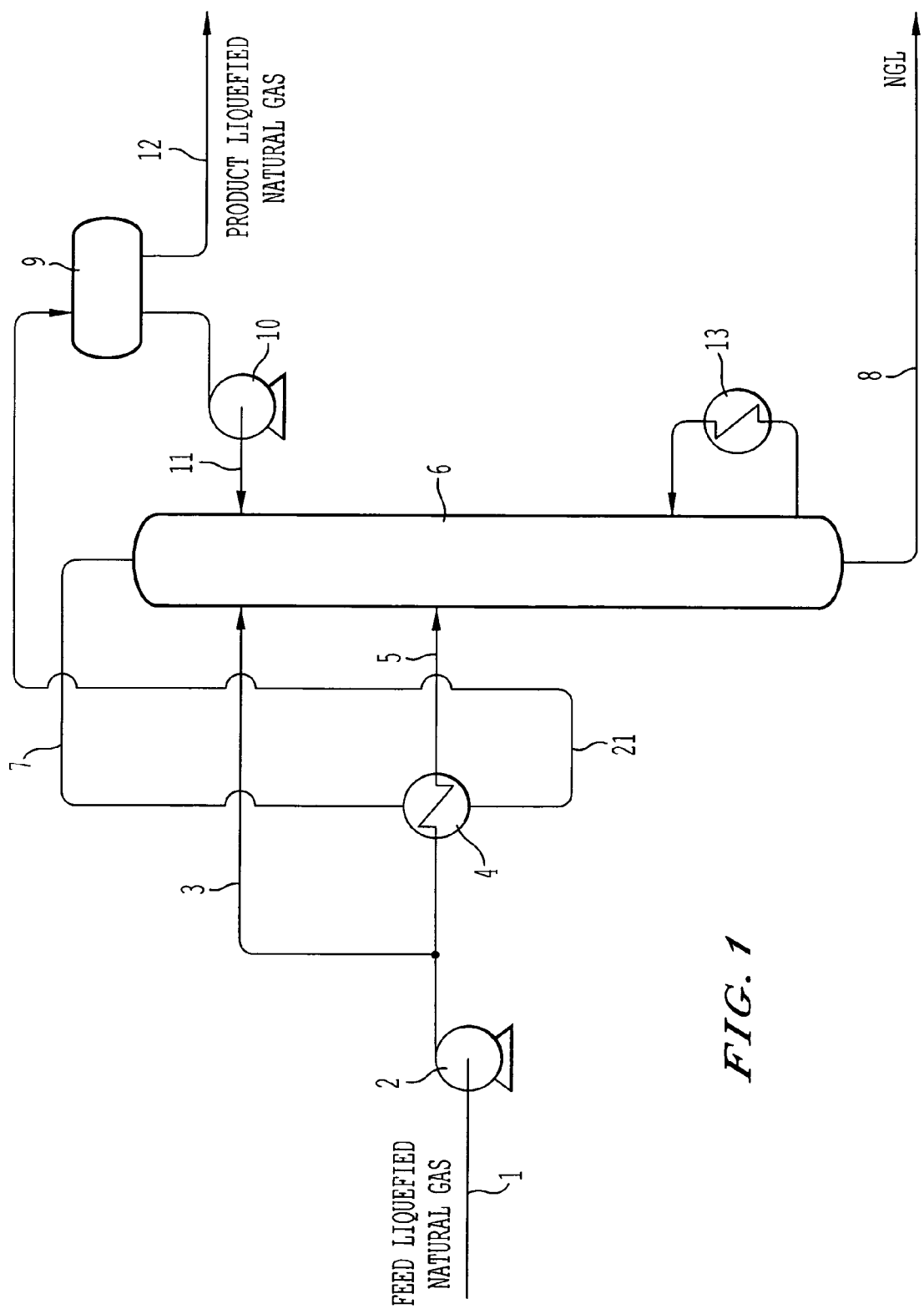
FIG. 1 is a flow diagram for explaining an embodiment of the present process for separation of hydrocarbons from liquefied natural gas.

FIG. 1 shows a process for separation of hydrocarbons from a liquefied natural gas according to the present invention. A description is herein made of a process for recovery of ethane from a liquefied natural gas. The process for recovery of ethane from a liquefied natural gas is a process for separating, by distillation, the hydrocarbon components contained in a feed liquefied natural gas, into methane and heavier components of hydrocarbons less volatile than methane. Incidentally, FIG. 1 is only to explain a preferred embodiment of the present invention, and the present invention is in no way limited thereby.

For example, feed liquefied natural gas 1 consisting substantially of methane and hydrocarbons of 2 or more carbon atoms is sent to feed liquefied natural gas pump 2 and is pressurized to a pressure which is a operation pressure of demethanizer 6 plus a head required for reflux condenser 4, pressure loss of pipe and demethanizer feed. The liquefied natural gas used as a raw material can be obtained by liquefying a natural gas at around atmospheric pressure, for example, at least 99 kPa (A) and at most 150 kPa (A), and at its bubble point or a lower temperature (for example, at least −170° C. and at most −150° C.). The "(A)" as unit of pressure indicates an absolute pressure.

Part of the pressurized feed liquefied natural gas is sent to the demethanizer 6 as feed liquefied natural gas reflux 3, and the remainder is sent to the reflux condenser (heat exchanger) 4. This feed liquefied natural gas reflux is preferable for improvement in separation efficiency. The ratio of dividing into the feed liquefied natural gas reflux and the feed liquefied natural gas sent into the reflux condenser is preferred to be determined so that the ethane recovery rate in the demethanizer (the propane recovery rate in deethanizer) is maximized. For increasing the ethane recovery rate (the propane recovery rate in deethanizer), the above dividing ratio is preferably about 1:20 (1 is the reflux and 20 is sent to the reflux condenser) to 1:5.

The feed liquefied natural gas is subjected to heat exchange with a demethanizer overhead gas 7 in reflux condenser 4 and heated, and the resulting fluid is fed into the demethanizer 6 as demethanizer feed 5 through a pipe, by a pressure difference between the outlet of feed liquefied natural gas pump 2 and the demethanizer 6. At the outlet of the reflux condenser 4, this fluid 5 may be partially or wholly a gas, or may be wholly a liquid.

When there is given, to the reflux condenser 4, a thermal load capable of condensing the whole amount of the demethanizer overhead gas 7, it is easy to make the whole amount of a product natural gas to be withdrawn, into a liquid.

Figure 2:
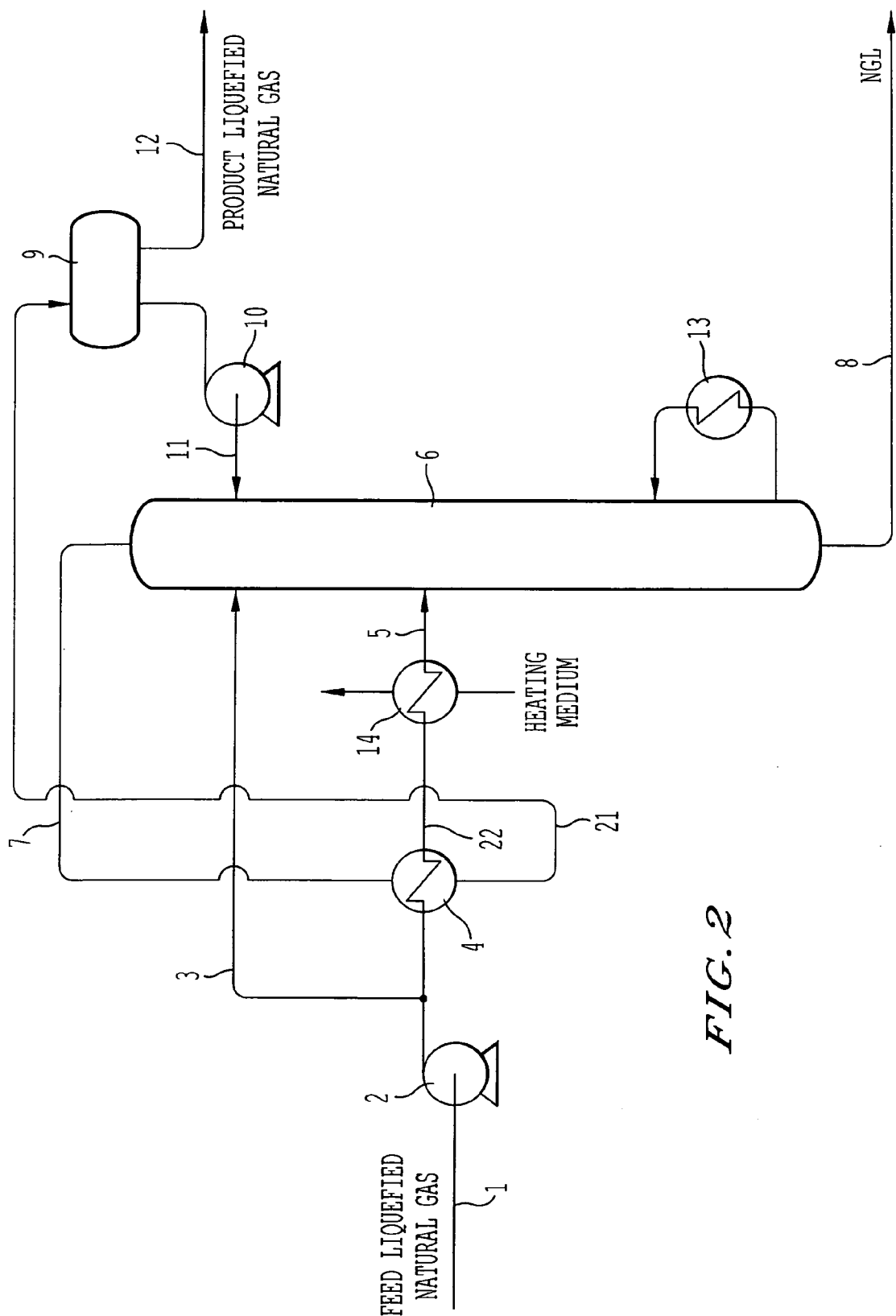
FIG. 2 is a flow diagram for explaining another embodiment of the present process for separation of hydrocarbons from liquefied natural gas.

Fluid 5 at the outlet of the reflux condenser 4, when fed into the demethanizer 6, is preferably a gas at least partially from the viewpoint of reducing the load of reboiler 13. Hence, as shown in FIG. 2, when feed liquefied natural gas 22 heated at the reflux condenser 4 is a liquid wholly, or when required, it is possible to provide, between the reflux condenser and a demethanizer, at least one heating means such as another heat exchanger (second heat exchanger) 14 or the like to further heat fluid 22, increase a gas-phase proportion in the fluid and then feed the fluid into the demethanizer.

As the reflux condenser and the second heat exchanger, there can be used a known heat exchanger of multi-tubular type, plate type or the like depending upon the operation conditions. The material therefor can be selected appropriately from known materials for the heat exchanger, such as stainless steel and the like.

As the demethanizer 6, there can be used a known demethanizer capable of separating methane from a liquefied natural gas. The demethanizer has, for example, trays or packings inside the column and separates more volatile components from less volatile components by distillation. An appropriate operation pressure of the demethanizer differs depending upon the composition of the feed liquefied natural gas used and the required specification for demethanizer bottom liquid but is preferably about at least 1.0 MPa (A) and at most 4.5 MPa (A).

A reboiler 13 is provided at the bottom portion of the demethanizer and heat is applied thereto to vaporize the methane contained in the bottom liquid of the demethanizer and control the methane concentration in the liquid at an intended level or lower. Installation of the reboiler is preferred to increase separation efficiency.

From the top part of the demethanizer is separated residue gas 7 from which components such as ethane, propane and the like are removed and which is composed mainly of methane. The residue gas is sent to the reflux condenser 4 and liquefied by heat exchange with the feed liquefied natural gas, and the liquefied residue gas is sent to a reflux drum 9.

From the reflux drum 9 is withdrawn a part of the liquefied residue gas as product liquefied natural gas 12. For example, the product liquefied natural gas is withdrawn by a liquid pressurization means such as pump or the like, vaporized and then sent to a natural gas pipeline. The liquid pressurization means, for example, can be selected from commercially available means depending upon the pressure of natural gas pipeline. The remainder liquid of the reflux drum 9 is pressurized by a liquid pressurization means (e.g. reflux pump 10) appropriately provided for pressure balance and is returned to the demethanizer as liquefied residue gas reflux 11. This liquid pressurization means, for example, can be selected from commercially available pumps such as centrifugal pump or the like depending upon the conditions such as flow amount, head and the like. The ratio of the amount of withdrawn product liquefied natural gas and the amount of liquefied residue gas reflux can be determined depending upon the required ethane recovery ratio (propane recovery ratio in deethanizer). In the case of, for example, an ethane recovery process, the ratio can be set at about 8:2 (8 is product liquefied natural gas and 2 is liquefied residue gas reflux) to 5:5 in order to obtain an ethane recovery ratio of at least 90% and at most 98%.

The methane concentration in liquefied residue gas reflux 11 is higher than the methane concentration in feed liquefied natural gas reflux 3; consequently, the efficiency of separation of methane from ethane during distillation operation is high. Therefore, by giving liquefied residue gas reflux 11, there can be obtained a product liquefied natural gas of higher methane concentration than in a process (for example, the process described in the Patent Literature 1) in which only feed liquefied natural gas reflux 3 is given as a reflux for demethanizer. Accordingly, the amount of ethane contained in product liquefied natural gas and lost is small, whereby a higher ethane recovery ratio is obtained.

Incidentally, "reflux" means, in a narrow sense, a liquid which is a condensed liquid of the overhead gas of distillation column and returned to the distillation column; however, in a broad sense, it includes, in addition thereto, even a liquid fed into the top part of distillation column for rectification. In the present invention, "reflux" is used in a broad sense and includes even a liquid fed into a distillation column and having a rectification effect.

As mentioned above, the product natural gas obtained by separation of heavier fraction from feed liquefied natural gas is, in some cases, pressurized in order to, for example, send it to a pipeline. In this case, the energy for pressurization is large if the product natural gas is a gas. Therefore, the proportion of liquid in the product natural gas withdrawn is preferred to be higher. Hence, in the present invention, at least a part, preferably the whole part of the product natural gas is allowed to be a liquid. In this connection, in the above embodiment, residue gas 7 is liquefied wholly in the reflux condenser and the product withdrawn is wholly a liquid, that is, a product liquefied natural gas.

The amount of heat exchange in the reflux condenser 4 can be such an amount that the residue gas can be liquefied wholly. However, as described in detail later with reference to FIG. 3, it is not necessary to liquefy the residue gas wholly in the reflux condenser 4.

The reflux drum 9 is preferably provided for easy operation of pump 10. The reflux drum can be, for example, a cylindrical pressure vessel having a head at each end. As the capacity thereof, an appropriate capacity can be determined from the standpoint of continuing stable operation of the pump. The reflux drum can function also as a gas-liquid separator when the fluid fed from reflux condenser 4 contains a gas. In this case, the dimension (diameter×length) of the reflux drum can be determined appropriately so that the velocity of gas becomes equal to or smaller than the settling velocity of droplets for conducting gas-liquid separation. The material of the reflux drum can be selected from materials (e.g. stainless steel) resistant to low temperatures because the reflux drum is operated at low temperatures of, for example, about −80° C. to −110° C.

In an embodiment shown in FIG. 1, the reflux means for refluxing part of the liquefied residue gas to the distillation column has pump 10, reflux drum 9 and piping appropriately provided. To the reflux drum are connected a line extending to the pump 10 and a withdrawal line 12 for withdrawing a product liquefied natural gas. The withdrawal line may be formed appropriately by, for example, piping.

To the demethanizer are fed three kinds of fluids (indicated by 3, 5 and 11 in FIG. 1). Particular feeding positions of these fluids can be determined appropriately depending upon the temperature and methane concentration of each fluid.

From the bottom of demethanizer 6 are separated ethane, propane and further heavier components as NGL (natural gas liquid) 8. The NGL is, for example, separated into individual components by a NGL separation process provided further downstream.

A lower ethane concentration in overhead gas 7 means a higher ethane recovery rate. Therefore, the ethane concentration in the overhead gas is preferred to be as low as possible and is preferably 5 mol % or less, more preferably 1 mol % or less.

The NGL is substantially composed of recovered hydrocarbons of 2 or more carbon atoms, is sent to, for example, an NGL separation facility provided further downstream, and is separated into products of ethane, propane, butane, etc. In such a case, the methane concentration in the NGL is preferred to be low to such an extent that the specification of ethane product is satisfied, and is preferably 2 mol % or less, more preferably 1 mol % or less.

In an embodiment shown in FIG. 2, a feed liquefied natural gas is heated by reflux condenser 4, and resulting fluid 22 is further heated by a heating means such as a second heat exchanger 14 or the like, provided in addition to the reflux condenser 4, and becomes fluid 5. Each of fluid 22 and fluid 5 may be a gas partially or wholly, or may be a liquid wholly. Use of the second heat exchanger is particularly preferred when fluid 22 is a liquid wholly and fluid 5 is made into a gas partially or wholly. By making the fluid fed to a demethanizer into a gas at least partially, the load of reboiler 13 can be reduced.

As the heating medium used in the second heat exchanger 14 for heating of fluid 22, there can be used an appropriate fluid having a desired temperature level. There can be used a fluid supplied from outside the separation apparatus of the present invention, or a fluid inside the separation apparatus. The second heat exchanger is provided in order to reduce the load of reboiler 13; therefore, when a fluid supplied from outside is used as the heat source of the second heat exchanger, it is preferred to use, as the heat source, one which requires a lower energy consumption (e.g. sea water or an aqueous glycol solution heated by an air heater) than the heat source of the reboiler 13, ( e.g. steam, a heat transfer oil or a heat generated by a heating furnace).

Figure 3:
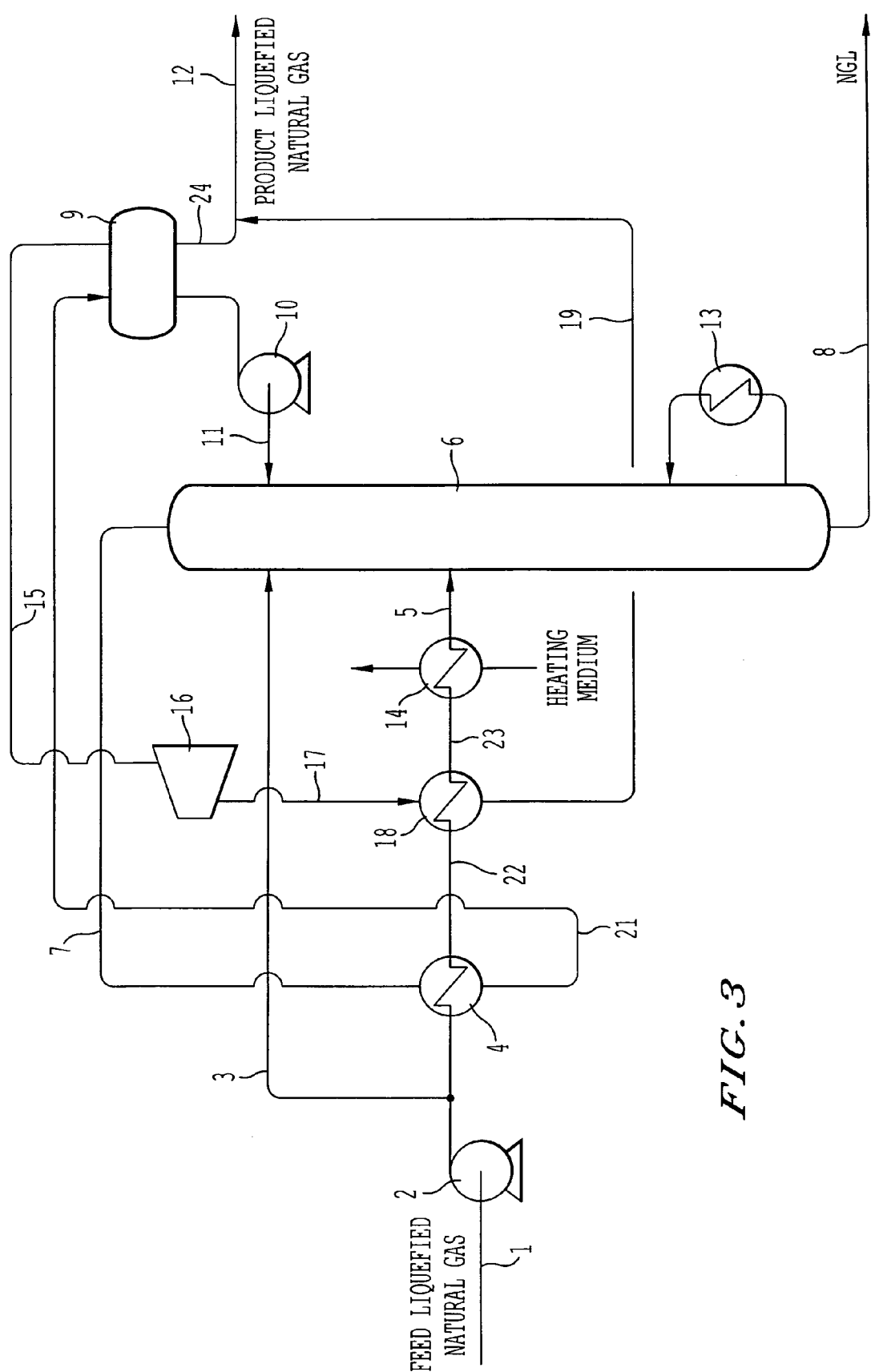
FIG. 3 is a flow diagram for explaining a further embodiment of the present process for separation of hydrocarbons from liquefied natural gas.

In FIG. 3 is shown another preferred embodiment of the process for separation of hydrocarbons from liquefied natural gas according to the present invention. In the embodiment shown in FIG. 3, there are added, to the embodiment of FIG. 1, a pressurized residue gas condenser 18 and a residue gas compressor 16. In this embodiment, as compared with when the embodiment shown in FIG. 1 is used, it is possible to reduce the operation pressure of the demethanizer 6 and accordingly reduce the manufacturing cost and energy consumption of the demethanizer 6. Also in this embodiment, there are used, as a second heat exchanger, two heat exchangers, i.e. the pressurized residue gas condenser 18 and the demethanizer feed preheater 14. There may be a modification of the FIG. 3 embodiment, in which the demethanizer feed preheater is removed from the FIG. 3 embodiment and the pressurized residue gas condenser 18 alone is used as the second heat exchanger.

In FIG. 3, a feed liquefied natural gas is heated in the reflux condenser 4, and the resulting fluid is further heated in the pressurized residue gas condenser 18, before being sent to the demethanizer 6 as demethanizer feed 5. Residue gas 7 leaving the top of the demethanizer is not liquefied wholly but is liquefied only partially in the reflux condenser 4. Then, fluid 21 at the outlet of the reflux condenser 4 is sent to the reflux drum 9 and separated into a gas portion and a liquid portion. The reflux drum in this embodiment functions also as a gas-liquid separation means and line 15 for discharging the gas portion is connected to the reflux drum. Gas 15 separated in the reflux drum 9 (the gas is hereinafter referred to as second residue gas) is pressurized in residue gas compressor 16. Pressurized gas (hereinafter referred to as pressurized residue gas) 17 is cooled in the pressurized residue gas condenser 18 by heat exchange with the feed liquefied natural gas and is liquefied wholly. Liquefied pressurized residue gas 19 leaving the liquefied residue gas condenser 18 is withdrawn as product liquefied natural gas 12 together with part of the liquid separated in the reflux drum 9.

Here, fluid 23 obtained by heating of feed liquefied natural gas may be a gas partially or wholly or may be a liquid wholly, at the outlet of the pressurized residual gas condenser 18. Meanwhile, in this embodiment, fluid 19 is made into a liquid wholly at the outlet of the pressurized residual gas condenser 18 in order to make small the power required for pressurization done for sending fluid 19 into a pipeline as part of a product natural gas. Hence, as the thermal load of pressurized residual gas condenser 18, there is given a heat amount capable of condensing the whole amount of pressurized residual gas 17.

As the proportion at which residue gas 7 leaving the top of the demethanizer is liquefied in the reflux condenser 4 is smaller, the amount of the gas separated in the reflux drum 9 is larger and the thermal load required for complete condensation of pressurized residual gas 17 in the pressurized residual gas condenser 18 is larger. In this connection, the temperature when the feed liquefied natural gas leaves the pressurized residual gas condenser 18, that is, the temperature of fluid 23 is higher and its temperature difference from the temperature of pressurized residue gas 17 is smaller. Generally, in a heat exchanger, at least 2 to 3° C. is secured as the temperature difference between a high-temperature fluid and a low-temperature fluid (this difference is called temperature approach) for efficient heat exchange. In pressurized residual gas condenser 18 as well, the Is temperature approach is preferably at least 2° C., more preferably at least 3° C. Hence, the ratio at which residue gas 7 leaving the demethanizer top is liquefied in the reflux condenser 4 (that is, the molar ratio of liquid in fluid 21) is taken at a range in which a temperature approach of preferably at least 2° C., more preferably at least 3° C. is obtained in the pressurized residue gas condenser 18 and, from this standpoint, is preferably at least 0.4 and at most 0.9.

The pressure at the outlet of the residue gas compressor 16 is preferably a pressure at which the condensation temperature of pressurized residue gas 17 is hightened and a temperature approach of at least 2° C. is easily secured in the pressurized residue gas condenser 18, and is preferred to be higher by at least 0.2 MPa and at most 2.0 MPa than the pressure at the inlet of the residue gas compressor 16.

In this embodiment, a gas compressor is used as the pressurization means for pressurization of gas 15. However, other known pressurization means capable of pressurizing a gas can be used as well. As the gas compressor, there can be selected a known compressor such as centrifugal gas compressor or the like, depending upon the flow amount and pressure difference of gas. As the driver for the compressor, there can be used appropriately a motor, a steam turbine, a gas turbine or the like.

Also in the process for propane recovery, the principle is the same as in the above-mentioned process for ethane recovery. A deethanizer is used in place of the demethanizer 6; an overhead gas composed mainly of methane and ethane is separated from the top part of the deethanizer; from the bottom part of the deethanizer are separated propane and further heavier components as NGL.

EXAMPLES

The present invention is described in more detail below by way of Examples. However, the present invention is not restricted by these Examples.

Example 1

In this Example is described a process for ethane recovery from liquefied natural gas, having a flow shown in FIG. 1. Here, feed liquefied natural gas 1 is introduced into the present process under the saturated conditions (pressure: 0.1 MPa (A), temperature: −161° C.). The composition of this feed liquefied natural gas is shown in Table 1. The flow rate of the gas is 39,451 kg-mol/hr (kg-mol/hr means $10^3$ mol/hr). Incidentally, Cn (n is a natural number) indicates a hydrocarbon having a carbon number of n. C5+ indicates hydrocarbons of 5 or more carbon atoms.

TABLE 1

| Composition of feed liquefied natural gas (mol %) | |
| --- | --- |
| $N_2$ | 0.2 |
| C1 | 89.7 |
| C2 | 6.2 |
| C3 | 2.3 |
| C4 | 1.5 |
| C5+ | 0.1 |
| Total | 100.0 |

The liquefied natural gas is pressurized to 4.15 MPa (A) by the feed liquefied natural gas pump 2. A part of thereof is fed into the fourth (from top) tray of the demethanizer as feed liquefied natural gas flux 3, at a rate of 1,973 kg-mol/hr ($10^3$ mol/hr). The remaining 37,478 kg-mol/hr ($10^3$ mol/hr) is sent to the reflux condenser 4, undergoes heat exchange with demethanizer overhead gas 7 and is heated to −92.1° C., and is fed into the tenth tray of the demethanizer 6 in a complete liquid state.

The demethanizer is provided inside with trays of 19 stages in terms of theoretical stage number and is operated under the conditions of 3.75 MPa (A) and −89.1° C. at the top and 3.80 MPa (A) and 46.1° C. at the bottom. Here, the temperature of the bottom is determined by an equilibrium temperature at which the methane concentration in NGL 8 becomes 1 mol %. In order to operate the bottom at this temperature, a heat of 70.22 MW is added by the reboiler 13. The compositions of residue gas 7 separated from the top of the demethanizer and NGL 8 separated from the bottom are shown in Table 2. As to their flow rates, 50,676 kg-mol/hr ($10^3$ mol/hr) is for the residue gas and 3,978 kg-mol/hr ($10^3$ mol/hr) is for NGL.

TABLE 2

Compositions (mol %) of residue gas and NGL

|     | Residue gas | NGL |
| --- | --- | --- |
| $N_2$ | 0.3 | 0.0 |
| C1  | 99.6 | 1.0 |
| C2  | 0.1 | 60.3 |
| C3  | 0.0 | 23.3 |
| C4  | 0.0 | 14.8 |
| C5+ | 0.0 | 0.6 |
| Total | 100.0 | 100.0 |

Of the total ethane in the feed liquefied natural gas, 98.0% is recovered as NGL. 100% of propane and heavier-than-propane components are recovered as NGL.

Residue gas 7 leaving the top of the demethanizer undergoes heat exchange in reflux condenser 4 and liquefied wholly, and then is fed into the reflux drum 9. Then, 35,473 kg-mol/hr ($10^3$ mol/hr) is withdrawn as product liquefied natural gas 12 and remaining 15,203 kg-mol/hr ($10^3$ mol/hr) is fed into the uppermost tray of the demethanizer as liquefied residue gas reflux 11.

Comparative Example 1

There was employed the same process as in Example 1 except that residue gas 7 was liquefied wholly in the reflux condenser 4 and was withdrawn as a product liquefied natural gas. That is, the liquefied residue gas is taken out of the system with no returning of liquefied residue gas to demethanizer as reflux.

Downstream of the pump 2, the ratio at which the feed liquefied natural gas was divided into the feed liquefied natural gas reflux 3 and a portion sent to the reflux condenser 4 was varied to obtain the highest ethane recovery ratio.

The ethane recovery ratios in Example 1 and Comparative Example 1 are shown in Table 3. An ethane recovery ratio of 98.0% is achievable in Example 1, while in Comparative Example 1, the highest ethane recovery ratio is 92.0%. The ethane recovery ratio is dependent greatly upon the methane concentration in a reflux returned to the demethanizer. In Example 1, a reflux (a liquefied residue gas reflux) of methane concentration of 99.6 mol % is feedable and a higher ethane recovery is achievable than in Comparative Example 1.

TABLE 3

Ethane recovery ratio

|     | Comparative Example 1 | Example 1 |
| --- | --- | --- |
| Ethane recovery ratio | 92.0% | 98.0% |
| Methane concentration in demethanizer reflux |  |  |
| Feed liquefied natural gas reflux | 89.7 mol % | 89.7 mol % |
| Liquefied residue gas reflux | — | 99.6 mol % |

Example 2

In this Example is described a process shown in FIG. 2, in which the demethanizer feed preheater 14 is provided between the reflux condenser 4 and the demethanizer 6 in order to reduce the load of reboiler, and thereby a feed liquefied natural gas is heated by a heating medium supplied from outside to increase the proportion of gas in the demethanizer feed 5.

Here, feed liquefied natural gas 1 having the same composition as in Example 1 is introduced into the present process under the saturation conditions (pressure: 0.1 MPa (A), temperature: −161° C.). The flow rate is 39,451 kg-mol/hr ($10^3$ mol/hr) which is the same as in Example 1. Liquefied natural gas 1 is pressurized to 4.15 MPa (A) by a feed liquefied natural gas pump. A part thereof is fed into the fourth (from top) tray of a demethanizer as a feed liquefied natural gas reflux 3 at a rate of 1,973 kg-mol/hr ($10^3$ mol/hr). The remaining 37,478 kg-mol/hr ($10^3$ mol/hr) is sent to a reflux condenser 4, undergoes heat exchange with demethanizer overhead gas 7 and is heated to −91.9° C., is further heated to −77.6° C. at the demethanizer feed preheater 14 by heat exchange with a heating medium supplied from outside, and is fed into the tenth tray of the demethanizer. At this time, the demethanizer feed preheater 14 is provided with a heat of 25.76 MW which effectively reduces the thermal load of the reboiler 13.

The demethanizer is provided inside with trays of 19 stages in terms of theoretical stage number and is operated under the conditions of 3.75 MPa (A) and −88.9° C. at the top and 3.80 MPa (A) and 46.4° C. at the bottom. Here, the temperature of the bottom is determined by an equilibrium temperature at which the methane concentration in NGL becomes 1 mol %. In order to operate the bottom at this temperature, a heat of 34.65 MW is added from the reboiler 13. The compositions of the residue gas separated from the top of the demethanizer and the NGL separated from the bottom are shown in Table 4. As to their flow rates, 50,713 kg-mol/hr ($10^3$ mol/hr) is for the residue gas and 3,952 kg-mol/hr ($10^3$ mol/hr) is for NGL.

TABLE 4

Compositions of residue gas and NGL (mol %)

|     | Residue gas | NGL |
| --- | --- | --- |
| $N_2$ | 0.2 | 0.0 |
| C1  | 99.6 | 1.0 |
| C2  | 0.2 | 60.0 |
| C3  | 0.0 | 23.5 |
| C4  | 0.0 | 14.9 |
| C5+ | 0.0 | 0.6 |
| Total | 100.0 | 100.0 |

As shown in Table 4, of the total ethane in the feed liquefied natural gas, 96.9% is recovered as NGL. 100% of propane and further heavier components are recovered as NGL.

The residue gas 7 leaving the top of the demethanizer 6 undergoes heat exchange in the reflux condenser 4 and is liquefied wholly, and then is fed into the reflux drum 9. Then, 35,499 kg-mol/hr ($10^3$ mol/hr) is withdrawn as product liquefied natural gas 12 and remaining 15,214 kg-mol/hr ($10^3$ mol/hr) is fed into the uppermost tray of the demethanizer as liquefied residue gas reflux 11.

By adding the demethanizer feed preheater 14, the ethane recovery ratio is lower by 1.1% than in Example 1; however, the thermal load of the reboiler 13 can be reduced by 35.57 MW. Further, even when the heat amount (25.76 MW) added from the demethanizer feed preheater 14 is deducted, the thermal load of the whole process can be reduced by 9.81 MW.

Example 3

In this Example is described a process shown in FIG. 3, intended for reductions in manufacturing cost of demethanizer as well as in energy consumption, in which residue gas 7 is condensed only partially and not wholly in the reflux condenser 4 and there are added steps of separation of the gas in the reflux drum 9, pressurization of the separated gas in the residue gas compressor 16 and liquefaction of the pressurized gas in the pressurized residue gas condenser 18.

Here, feed liquefied natural gas 1 having the same composition as in Examples 1 and 2 is introduced into the present process under the saturation conditions (pressure: 0.1 MPa (A), temperature: −161° C.). The flow rate is 39,451 kg-mol/hr ($10^3$ mol/hr) which is the same as in Examples 1 and 2. Liquefied natural gas 1 is pressurized to 3.26 MPa (A) by a feed liquefied natural gas pump. A part thereof is fed into the fourth (from top) tray of a demethanizer as a reflux for demethanizer, at a rate of 1,973 kg-mol/hr ($10^3$ mol/hr). The remaining 37,478 kg-mol/hr ($10^3$ mol/hr) is sent to the reflux condenser 4, undergoes heat exchange with demethanizer overhead gas 7 and is heated to −99.9° C. (the temperature approach is 3° C. in the condenser 4), and, in the pressurized residue gas condenser 18, undergoes further heat exchange with pressurized residue gas 17 and is heated to −89.9° C. (the temperature approach is also 3° C. in the condenser 18).

Fluid 23 heated in the pressurized residue gas condenser 18 is further heated to −87.1° C. in the demethanizer feed preheater 14 by heat exchange with a heating medium supplied from outside, and is fed into the tenth tray of the demethanizer. At this time, the demethanizer feed preheater 14 is provided with a heat of 19.38 MW which effectively reduces the heat amount given by the reboiler 13.

The demethanizer is provided inside with trays of 19 stages in terms of theoretical stage number and is operated under the conditions of 2.86 MPa (A) and −96.9° C. at the top and 2.91 MPa (A) and 30.7° C. at the bottom. Here, the temperature of the bottom is determined by an equilibrium temperature at which the methane concentration in NGL becomes 1 mol %. In order to operate the bottom at this temperature, a heat of 33.36 MW is added from the reboiler 13. The compositions of the residue gas separated from the top of the demethanizer and the NGL separated from the bottom are shown in Table 5. As to their flow rates, 40,979 kg-mol/hr ($10^3$ mol/hr) is for the residue gas and 3,950 kg-mol/hr ($10^3$ mol/hr) is for NGL.

TABLE 5

Compositions of residue gas and NGL (mol %)

|  | Residue gas | NGL |
|---|---|---|
| $N_2$ | 0.2 | 0.0 |
| C1 | 99.6 | 1.0 |
| C2 | 0.2 | 60.0 |
| C3 | 0.0 | 23.5 |
| C4 | 0.0 | 14.9 |
| C5+ | 0.0 | 0.6 |
| Total | 100.0 | 100.0 |

As shown in Table 5, of the total ethane in the feed liquefied natural gas, 96.9% is recovered as NGL. 100% of propane and heavier-than-propane components are recovered as NGL.

Residue gas 7 leaving the top of the demethanizer 6 undergoes heat exchange in the reflux condenser 4 and is liquefied partially, is fed into the reflux drum 9, and is separated into a gas and a liquid.

Of the liquid portion separated in the reflux drum 9, 25,256 kg-mol/hr ($10^3$ mol/hr) is withdrawn as a product liquefied natural gas and the remaining 5,478 kg-mol/hr ($10^3$ mol/hr) is fed into the uppermost tray of the demethanizer as liquefied residue gas reflux 11. The gas portion separated in the reflux drum 9 is fed into the residue gas compressor 16 and pressurized to 4.01 MPa (A).

Pressurized residue gas 17 leaving the residue gas compressor 16 undergoes heat exchange in the pressurized residue gas condenser 18 and is liquefied wholly. Resulting liquefied pressurized residue gas 19 is withdrawn as a product liquefied natural gas. The flow rate of the liquefied pressurized residue gas is 10,254 kg-mol/hr ($10^3$ mol/hr). Liquefied residue gas 24 withdrawn from the reflux drum 9 and liquefied pressurized residue gas 19 are combined to become product liquefied natural gas 12 having a flow rate of 35,501 kg-mol/hr ($10^3$ mol/hr).

As shown in Table 6, in Example 3 compared with Example 2, there are added pressurized residue gas condenser 18 and residue gas compressor 16; however, the diameter of the demethanizer can be reduced by about 1,200 mm while an ethane recovery rate of 96.9% is being maintained. The length of the demethanizer is the same in Example 2 and Example 3. The operation pressure as well is reduced by 0.89 MPa as compared with that of Example 2 and, therefore, the design pressure of the demethanizer can be reduced. Consequently, the manufacturing cost of the demethanizer can be reduced.

TABLE 6

Comparison of demethanizer design

|  | Example 2 | Example 3 |
|---|---|---|
| Ethane recovery rate | 96.9% | 96.9% |
| Demethanizer diameter | 6,700 mm | 5,500 mm |
| Operation pressure (column top) | 3.75 MPa (A) | 2.86 MPa (A) |
| Manufacturing cost of demethanizer | High | Low |

As shown in Table 7, in Example 3 compared with Example 2, the pressure of the demethanizer can be made lower by 0.89 MPa; therefore, the energy required for separation of methane and hydrocarbons of 2 or more carbon atoms is smaller and the energy consumption of the whole process can be reduced by 5.3 MW while an ethane recovery rate of 96.9% is being maintained. Incidentally, the compressor is driven by an electric motor; the energy efficiency in generation of the electric power consumed by the motor is regarded as 30%; and the energy consumption by the compressor is converted into the heat amount of fuel gas used for power generation. Also, the energy efficiency when the thermal load consumed by the heating medium in the demethanizer feed preheater and the reboiler is generated in a heating furnace, is regarded as 80%; and the thermal load is converted into the heat amount of fuel gas used in the heating furnace.

TABLE 7

|  | Example 2 | Example 3 |
| --- | --- | --- |
| Ethane recovery rate | 96.9% | 96.9% |
| Compressor |  |  |
| Compressor power | — | 1.3 MW |
| Energy efficiency | — | 30% |
| Fuel gas consumption | — | 4.3 MW |
| Heating medium load |  |  |
| Thermal load of demethanizer feed preheater | 25.76 MW | 19.38 MW |
| Thermal load of reboiler | 34.65 MW | 33.36 MW |
| Total thermal load of heating medium | 60.41 MW | 52.74 MW |
| Energy efficiency | 80% | 80% |
| Fuel gas consumption | 75.5 MW | 65.9 MW |
| Total of fuel gas consumption | 75.5 MW | 70.2 MW |

What is claimed is:

1. A process for separating a feed liquefied natural gas containing at least methane and a hydrocarbon less volatile than methane, into a product natural gas enriched with methane and lean in the hydrocarbon less volatile than methane and a heavier fraction lean in methane and enriched with the hydrocarbon less volatile than methane, using a distillation column, comprising the steps of:
    (a) heating the feed liquefied natural gas in a heat exchanger;
    (b) passing the fluid heated in step (a) into a distillation column;
    (c) withdrawing the heavier fraction from a bottom part of the distillation column;
    (d) withdrawing a residue gas from a top part of the distillation column;
    (e) liquefying a part of the residue gas in the heat exchanger;
    (f) refluxing a part of the liquid portion of the fluid obtained in step (e) into the distillation column;
    (g) withdrawing, as the product natural gas, the remainder of the liquid portion of the fluid obtained in step (e), which has not been fed into the distillation column in step (f);
    (h) heating the fluid heated in step (a), in a heat exchanger different from the heat exchanger used in step (a), prior to step (b);
    (i) separating a gas portion from the fluid obtained in step (e) and then pressurizing the gas portion;
    (j) liquefying the whole portion of the fluid obtained in step (i), in the heat exchanger used in step (h); and
    (k) withdrawing the fluid obtained in step (j) as a product natural gas.

2. A process for separating a feed liquefied natural gas containing at least methane, ethane and a hydrocarbon less volatile than ethane, into a product natural gas enriched with methane and ethane and lean in the hydrocarbon less volatile than ethane and a heavier fraction lean in methane and ethane and enriched with the hydrocarbon less volatile than ethane, using a distillation column, comprising the steps of:
    (a) heating the feed liquefied natural gas in a heat exchanger;
    (b) passing the fluid heated in step (a) into a distillation column;
    (c) withdrawing the heavier fraction from a bottom part of the distillation column;
    (d) withdrawing a residue gas from a top part of the distillation column;
    (e) liquefying a part of the residue gas in the heat exchanger;
    (f) refluxing a part of the liquid portion of the fluid obtained in step (e) into the distillation column;
    (g) withdrawing, as the product natural gas, the remainder of the liquid portion of the fluid obtained in step (e), which has not been fed into the distillation column in step (f);
    (h) heating the fluid heated in step (a), in a heat exchanger different from the heat exchanger used in step (a), prior to step (b);
    (i) separating a gas portion from the fluid obtained in step (e) and then pressurizing the gas portion;
    (j) liquefying the whole portion of the fluid obtained in step (i), in the heat exchanger used in step (h); and
    (k) withdrawing the fluid obtained in step (j) as a product natural gas.

3. An apparatus for separating a feed liquefied natural gas containing at least methane and a hydrocarbon less volatile than methane, into a product natural gas enriched with methane and lean in the hydrocarbon less volatile than methane and a heavier fraction lean in methane and enriched with the hydrocarbon less volatile than methane, using a distillation column, comprising:
    a distillation column to which a heated feed liquefied natural gas is fed, from a bottom part of which the heavier fraction is withdrawn, and from a top part of which a residue gas is withdrawn;
    a first heat exchanger in which the feed liquefied natural gas and the residue gas are heat exchanged to heat the feed liquefied natural gas and to cool the residue gas and liquefy a part of the residue gas;
    a gas-liquid separation means for separating the partially liquefied fluid obtained in the first heat exchanger into a liquid portion and a gas portion;
    a refluxing means for refluxing a part of the liquid portion of the residue gas which has been liquefied in the first heat exchanger, into the distillation column;
    a line for withdrawing the remainder of the liquid portion of the residue gas which has been liquefied in the first heat exchanger, as a product natural gas;
    a pressurization means for pressurizing the gas portion;
    at least one second heat exchanger provided between the first heat exchanger and the distillation column, for further heating the liquefied natural gas, wherein said second heat exchanger liquefies the whole portion of the pressurized gas portion; and
    a line for withdrawing the fluid liquefied in the second heat exchanger, as a product natural gas.

4. An apparatus for separating a feed liquefied natural gas containing at least methane, ethane and a hydrocarbon less volatile than ethane, into a product natural gas enriched with methane and ethane and lean in the hydrocarbon less volatile than ethane and a heavier fraction lean in methane and ethane and enriched with the hydrocarbon less volatile than ethane, using a distillation column, comprising:

a distillation column to which a heated feed liquefied natural gas is fed, from a bottom part of which the heavier fraction is withdrawn, and from a top part of which a residue gas is withdrawn;

a first heat exchanger in which the feed liquefied natural gas and the residue gas are heat exchanged to heat the feed liquefied natural gas and to cool the residue gas and liquefy a part of the residue gas;

a gas-liquid separation means for separating the partially liquefied fluid obtained in the first heat exchanger into a liquid portion and a gas portion;

a refluxing means for refluxing a part of the liquid portion of the residue gas which has been liquefied in the first heat exchanger, into the distillation column;

a line for withdrawing the remainder of the liquid portion of the residue gas which has been liquefied in the first heat exchanger, as a product natural gas;

a pressurization means for pressurizing the gas portion;

at least one second heat exchanger provided between the first heat exchanger and the distillation column, for further heating the liquefied natural gas, wherein said second heat exchanger liquefies the whole portion of the pressurized gas portion; and a line for withdrawing the fluid liquefied in the second heat exchanger, as a product natural gas.

\* \* \* \* \*